United States Patent [19]
Fletcher

[11] Patent Number: 6,083,308
[45] Date of Patent: Jul. 4, 2000

[54] ANTI-CORROSIVE PIGMENT AND COMPOSITIONS FORMULATED WITH SUCH PIGMENTS

[76] Inventor: Tim Fletcher, Judengasse 9, D-67547 Worms, Germany

[21] Appl. No.: 09/029,478
[22] PCT Filed: Aug. 15, 1996
[86] PCT No.: PCT/EP96/03600
  § 371 Date: Feb. 24, 1998
  § 102(e) Date: Feb. 24, 1998
[87] PCT Pub. No.: WO97/08245
  PCT Pub. Date: Mar. 6, 1997

[30] Foreign Application Priority Data

Aug. 25, 1995 [EP] European Pat. Off. .............. 95250209

[51] Int. Cl.⁷ .............................. C09B 57/10; C09C 1/00; C08K 5/42; C09K 3/12; C09D 5/34
[52] U.S. Cl. ..................... 106/14.12; 106/14.41; 106/14.44; 106/404; 106/419; 106/447; 106/450; 106/460; 106/462; 106/480; 106/493; 106/494; 106/499; 106/505

[58] Field of Search .............................. 106/14.12, 14.13, 106/14.14, 14.41, 14.44, 419, 447, 450, 460, 462, 480, 493, 494, 499, 505, 404

[56] References Cited

FOREIGN PATENT DOCUMENTS

| 0096526 | 5/1983 | European Pat. Off. . |
| 0389653 | 3/1989 | European Pat. Off. . |
| 0634460 | 7/1994 | European Pat. Off. . |
| 60-256377 | 7/1985 | Japan . |

*Primary Examiner*—Anthony Green
*Attorney, Agent, or Firm*—Charles A. Cross

[57] ABSTRACT

Effective anti-corrosive pigments are obtained using basic or neutral to basic polyvalent metal organophosphonates. The anti-corrosive organophosphonate pigments may optionally contain a co-acidic substance such as silica. The organophosphonate pigments provide ant-corrosive protection comparable to traditional pigments while enabling the avoidance of heavy metals.

31 Claims, No Drawings

ANTI-CORROSIVE PIGMENT AND COMPOSITIONS FORMULATED WITH SUCH PIGMENTS

The incorporation of traditional anti-corrosive pigments such as red lead, lead silicochromate, strontium chromate, zinc tetroxy chromate and zinc potassium chromate into coating systems for use over metallic substrates enables high levels of corrosion protection to be realised. This corrosion protection refers particularly to both retention of adhesion of the coating system to metallic substrates (under moist and/or corrosive conditions) and prevention of rusting of the substrate. These otherwise effective pigments are however toxic. Accordingly, they have either been replaced by available lower or non-toxic alternatives or their continued use is coming under increasing scrutiny and regulation.

Examples of existing commercial lower or non-toxic alternative pigments are metal salts of phosphates, phosphosilicates, borosiicates, borates, metaborates, molybdates, polyphosphates, triphosphates and phosphites using typically calcium, strontium, barium, zinc and aluminium as the metallic cations. Ion-exchanged silicas such as calcium-exchanged silica have also been introduced. Zinc phosphate is currently by far the most widely used low or non-toxic anti-corrosive pigment.

It has been found that these alternative pigments do not always achieve the same level of performance as the traditional pigments. In some applications, performance differentials are so great as to preclude use of the available non-toxic pigments.

While the above discussion applies to both non-aqueous solvent-borne and water-borne coating systems, in the developing field of water-borne technology, there is the additional problem of matching anti-corrosive performance levels otherwise achievable with non-aqueous solvent-borne counterparts. The traditional pigments enable quite good performance levels to be achieved in water-borne coating compositions, but there is little interest to develop new water-borne systems based on such pigments in view of the toxicity problems.

In many types of coatings, the non-toxic alternative pigments are sometimes used in combinations of two or more pigments in an effort to improve performance levels. This approach has met with varying degrees of success. The use of combinations of pigments naturally adds to the complexities involved in coating development and manufacture.

Currently, there is increasing emphasis on anti-corrosive pigments entirely free of heavy metals, including zinc. This is particularly true in water-borne systems as a result of waste water problems. Unfortunately, the non-toxic alternative pigments given above typically do not satisfy this zinc-free requirement. The zinc-free pigments that are available generally provide a lower level of corrosion protection than pigments which contain zinc and/or other heavy metals.

Organophosphonic acids and their water-soluble salts are known in the field of water treatment chemicals where they are used to help inhibit is scale formation and metal corrosion. These compounds are added to water systems such as cooling water and boiler water at very low concentrations, typically in the ppm range. The formulation of an effective water treatment chemical is very complex, but to exert adequate corrosion inhibition, such organophosphonic compounds are normally used in conjunction with ppm levels of polyvalent metal cations such as calcium and zinc.

Some attempts have been made at using specific organophosphonic species in the formation of anti-corrosion pigments, but the results obtained have not been very convincing. Such pigments are mostly useful only in combination with other anti-corrosive pigments. Thus, there remains a need for improved anti-corrosion pigments which provide excellent corrosion protection while avoiding the need to use zinc and/or other heavy metals.

SUMMARY OF THE INVENTION

Effective anti-corrosion pigments (suitable for incorporation into polymeric and protective materials such as coatings, adhesives, sealants and organic pretreatments) have now been found. The anti-corrosive pigments of the invention provide performance superior to conventional lead and chromate free pigments and match the performance of the traditional pigments. Further, the anti-corrosion pigments of the invention achieve high anti-corrosive performance levels without the necessity to combine two or more different types of anti-corrosive pigment. Further, the anti-corrosion pigments of the invention achieve useful levels of anti-corrosive performance without the need for addition of heavy metals and/or zinc.

In one aspect, the invention encompasses anti-corrosion pigments which contain polyvalent metal salts of organophosphonic compound(s) in the basic state. The organophosphonic compound(s) may contain one or more phosphonic groups per molecule. Preferred organophosphonic compounds are phosphonocarboxylic acids such as 2-hydroxy-2-phosphonoacetic acid, or 2-phosphono-1,2,4-tricarboxylic acid and phosphonates such as nitrilotris (methylenephosphonic) acid, 1-hydroxyethane(1,1-iphosphonic acid) and phosphonated derivatives of acrylic acid and maleic acid. If desired, mixtures of different organophosphonic compounds and/or different polyvalent metals may be used.

In another aspect, the invention encompasses pigments containing neutral to basic polyvalent metal salts of organophosphonic compound components combined with a co-acid component. The combination of these components is preferably done during pigment preparation by partial replacement of the organophosphonic compound with the co-acid, whereby at least a portion of the co-acid is reacted with polyvalent metal cations. The co-acid is preferably polyvalent and may be solid or liquid co-acids like silicas, sheet silicates, crystalline aluminosilicates such as zeolites, other aluminosilicates and their combinations, phosphoric acid, polyphosphoric acid, boric acid or carboxylic acid derivatives such as maleic acid, polymaleic acid, polyacrylic acid and its derivatives or hydroxyacids like citric acid.

The invention further encompasses anti-corrosive coating compositions containing the pigments of the invention. The coating compositions may be non-aqueous solvent-borne or water-borne anti-corrosive coatings.

The invention further encompasses methods for making the pigments and pigment-containing compositions of the invention. The pigments of the invention are preferably produced in an aqueous environment by reaction of the appropriate organophosphonic compounds with the appropriate polyvalent metal cations. The polyvalent metal cations may be introduced in various forms as oxides, hydroxides, carbonates, chlorides, nitrates or suiphates. The reaction may be controlled by control of pH. Unwanted counter-ions may be removed by washing and/or thermal decomposition. The pigments may then be further prepared by oven drying and milling, by wet-milling and spray drying or by other techniques to obtain the desired pigment particles. Basic salts may be prepared using an excess of a sparingly soluble polyvalent metal oxide or hydroxide.

These and other aspects of the invention are described in further detail below.

DETAILED DESCRIPTION OF THE INVENTION

It has been discovered that the polyvalent metal salts of organophosphonic compounds can be prepared as basic salts by addition of an excess of polyvalent metal cations during preparation to produce effective anti-corrosive pigments which enable the formation of anti-corrosive coatings displaying a very high level of corrosion protection. It has further been discovered that neutral or basic polyvalent metal salts of organophosphonic compounds may be used in combination with a co-acid to produce effective anti-corrosive pigments which enable the formation of anti-corrosive coatings displaying a very high level of corrosion protection. These anti-corrosive pigments provide the possibility of obtaining a high level of corrosion protection while avoiding the use of heavy metals.

The organophosphonic compounds useful in the invention may contain one or more phosphonic groups. The initial organophosphonic compounds, reacted to form the pigments of the invention, may be in acid form, monovalent cation (e.g., alkali metal or ammonium) salt form, or in any other form suitable for use in forming the desired polyvalent metal cation salts. The organophosphonic compounds may be used individually or in combination.

Examples of suitable organophosphonic compounds containing one phosphonic (acid) group per molecule are phosphonocarboxylic acids such as 2-hydroxy-2-phosphonoacetic acid, 2-phosphonobutane-1,2,4-triacetic acid and phosphonated oligomers of maleic acid, acrylic acid ormaleic acid and acrylic acid cooligomers. Examples of suitable organophosphonic compounds containing at least two phosphonic acid groups per molecule include diphosphonic acids such as alkylmethane-1-hydroxy-1,1-diphosphonic acids where the alkyl group may be substituted or unsubstituted having from 1–12 carbon atoms (e.g., methane-1-hydroxy-1,1-diphosphonic acid, or propane-1-hydroxy-1,1-diphosphonic acid).

Amino compounds containing two or more N-alkylene phosphonic acid groups may also be used to prepare poiyvalent metal salts according to the invention. Examples of such amino compounds are alkylamino-di(alkylene phosphonic acids) where the alkyl group can be substituted or unsubstituted and have from 1 to 12 carbon atoms such as propyl, isopropyl, butyl, hexyl or 2-hydroxyethyl and the alkylene group may have from 1 to 5 carbon atoms; also amino-tri(alkylene phosphonic acids) such as nitrilo-tris-(methylene phosphonic acid) and nitrilo-tris-(propylene phosphonic acid). Other suitable derivatives from amino compounds are alkylene diamine-tetra-(alkylene phosphonic acids) such as ethylene diamine-tetra-(methylene phosphonic acid), dialkylene triamine-penta-(alkylene phosphonic acids) such as diethylene triamine-penta-(methylene phosphonic acids), and so on.

Of the above-mentioned phosphonic compounds, most preferred are 2-hydroxy-2-phosphonoacetic acid, nitrilo-tris-(methylene phosphonic acid), 2-phosphonobutane-1,2, 4-triacetic acid, 1-Hydroxyethane-1,1-diphosphonic acid, phosphonosuccinic acid and phosphonated oligomers of maleic acid, acrylic acid ormaleic acid and acrylic acid co-ligomers.

Among suitable polyvalent metal cations for use in the invention are cations of magnesium, calcium, strontium, barium, iron, cobalt. nickel, zinc, aluminium, titanium and zirconium. Preferred cations are magnesium, calcium, zinc and aluminium. The polyvalent metal cations may be used individually or as a mixture of two or more. Preferred polyvalent metal combinations are calcium/zinc salts or calcium/magnesium salts. The polyvalent metal cations may be used (i.e., reacted with the organophosphonic compound) in the form of oxides, hydroxides, carbonates, chlorides, sulphates, nitrates, oxalates or other compounds or mixtures of is such compounds. Preferably, the polyvalent metal cations are in the form of metal oxides or hydroxides. Where basic salts are desired, preferably sparingly soluble (solubility at 20° C. of less than 0.1 g/l) polyvalent metal oxides or hydroxides are used in excess. Examples of suitable sparingly soluble metal oxides are zinc oxide, magnesium oxide, aluminium oxide, strontium oxide, barium oxide, cobalt oxide and nickel oxide. Particularly preferred are zinc oxide, magnesium oxide or magnesium hydroxide and alumina.

As noted above, certain pigments of the invention may contain a combination of neutral or basic polyvalent metal salts of organophosphonic compounds with a co-acid. The available acid sites of the co-acid are themselves preferably partially or completely reacted with polyvalent metal cations. Suitable co-acids for use according to the invention can be divided into two classes: those which are water-soluble and those which can be considered essentially water-insoluble solids with replaceable surface hydrogen atoms such as silicas or silica aluminas.

Examples of suitable water-soluble co-acids include phosphoric acid or boric acid. Compounds containing carboxylic acid groups which are water-soluble under the pigment preparation conditions may also be used; examples of such compounds include polycarboxylic acids such as maelic acid, succinic acid, azelaic acid, polymaleic acid and its derivatives, polyacrylic acid and its derivatives, and hydroxyacids such as tartaric acid and citric acid. In appropriate cases, adequate water solubility is achieved by use of the sodium or ammonium neutralised salts of the carboxylic acid-containing compounds.

Examples of essentially water-insoluble solid co-acids include silica, titania, zirconia, ferric oxide, sheet silicates, crystalline aluminosilicates such as zeolites, other aluminosilicates and their combinations. These solid co-acids may be used in there various colloidal and powder forms. Particularly preferred solid co-acids are silicas and silica aluminas, especially amorphous silicas or silica aluminas. If desired, the solid co-acid particles may be porous.

The pigments of the invention comprise organophosphonates which are prepared as neutral or basic salts by addition of polyvalent metal cations during preparation. The degree of basic character is defined by the ratio of polyvalent metal cations to total acid groups (i.e. phosphonic and any other acid groups) in the organophosphonic molecule on an equivalents basis (i.e. taking into account valence). Neutral organophosphonate salts correspond to an equivalents ratio of polyvalent metal cations to total acid groups of 1:1. Basic organophosphonate salts correspond to an equivalents ratio of polyvalent metal cations to total acid groups of greater than 1:1. Thus, for example, if zinc were the polyvalent metal cation (+2 valence) and an organophosphonic compound containing three acid groups were used, a neutral salt would correspond to a 1.5:1 molar ratio of zinc cation to organophosphonic compound (or a 1:1 equivalents ratio).

For the basic organophosphonates of the invention, the equivalents ratio of polyvalent metal cations to acid groups preferably lies in the range of about 1.25:1 to 6:1, more preferably in the range of about 1.5:1 to 5:1. For the neutral to basic organophosphonates of the invention used in combination with a co-acid, the equivalents ratio of polyvalent metal cations to acid groups preferably lies in the range of about 1:1 to 6:1, more preferably in the range of about 1.25:1 to 5:1.

Applying the above ranges to the system of zinc and 2-hydroxy-2-phosphonoacetic acid, 1 mole of the acid may be reacted with from 1.5 to 9 moles of zinc oxide. As a further example, 1 mole of 2-phosphonobutane-1,2,4-triacetic acid may be reacted with from 2.5 to 15 moles of zinc oxide. One mole of nitrilo-tris-(methylene phosphonic acid) may be reacted with from 3 to 18 moles of zinc oxide. As an example of a mixed metal organophosphonate pigment, 1 mole of 2-hydroxy-2-phosphonoacetic acid may be reacted with up to 1.5 moles of calcium hydroxide and up to 12 moles (less the moles of calcium hydroxide used) of zinc oxide.

The neutral to basic polyvalent organophosphonates of the invention may be used in combination with co-acid(s). It should be understood that this replacement of part of the organophosphonic acid with a co-acid results in a chemical or physical combination of the organophosphonate and the co-acid (or its polyvalent metal salts) in the same pigment particle. Within the above range of polyvalent metal cations to acid groups, the organophosphonic compounds may be replaced with up to 95% (on an acid group basis) of water-soluble co-acids, more preferably about 5 to 75% on an acid group basis.

For solid co-acids, replacement of the organophosphonic compound can be made on the above-mentioned acid group basis where the amount of available acid groups in the solid co-acid is calculated based on the quantity of surface acid sites and available surface area. Alternatively, the amount of solid acid used may simply be varied on a weight basis such that the pigment particles contain up to 95 wt. % of solid co-acid (Bronsted acid form, dry basis) based on the total weight of organophosphonic compound (Bronsted acid form, dry basis) and solid co-acid (Bronsted acid form, dry basis), more preferably 5 to 75 wt. %, most preferably about 25 to 60 wt. %. For the solid co-acid, the "Bronsted acid form" is meant to indicate that the available acid sites are occupied by $H^+$ ions. Within the ranges of co-acid, the most desired amount of replacement may be determined by actual corrosion protection tests and/or materials cost considerations.

The pigments of the invention are preferably prepared by processes involving the reaction of organophosphonic acid (or monovalent cation salt thereof, collectively referred to as "organophosphonic acid" below to simplify the discussion) with a source of polyvalent metal cations (typically a polyvalent metal compound). Preferably, the organophosphonic acid(s) is added to the polyvalent metal compound(s) in an aqueous medium. The organophosphonic acids and the polyvalent metal cations in the resulting mixture undergo a reaction. Preferably, the reaction is allowed to occur to substantial completion as indicated by a stabilising of the pH. If desired, the reaction mixture may be heated to accelerate the rate of reaction and/or to ensure completion of the reaction. For example, the reaction mixture may be heated to temperatures of up to 95° C. (e.g. 40–95° C.) for periods up to 24 hours. Mixing and uniformity of the reaction mixture can be achieved by a variety of conventional means such as simple stirring and high shear mixing or a combination of such techniques. The various reactions useful in producing anti-corrosion pigments according to the invention may be conducted batchwise or continuously.

Where the initial organophosphonic compounds are added to the reaction mixture in their monovalent salt form, the source of polyvalent metal cations is preferably a water-soluble salt such as a sulphate, chloride or nitrate. Where the source of polyvalent metal cations comprises such water-soluble salts, the reaction mixture pH may be adjusted to an appropriate level (e.g., 6 to 9) by addition of a base such as sodium hydroxide or ammonium hydroxide to facilitate precipitation of the desired polyvalent metal organophosphonates.

Where a basic polyvalent metal organophosphonate salt (i.e. greater than 1:1 polyvalent metal:acid group equivalents ratio) is desired, preferably at least a portion of the source of polyvalent metal cations is in the form of a sparingly soluble compound (typically an oxide or hydroxide) which is added to the reaction mixture prior, during or after the addition of organophosphonic acid, but preferably before any thermal treatment, to create the requisite excess (above the 1:1 equivalents ratio) of polyvalent metal cation.

Solid co-acids can be added at any stage prior to heating of the reaction mixture. Preferably, the solid co-acid is added to the aqueous medium before the addition of the organophosphonic acid such that the source of polyvalent metal cations and the co-acid come into contact before addition of the organophosphonic acid. Water-soluble co-acids are preferably added at the same time as the organophosphonic acid. In some cases, the actual point of addition of the water-soluble co-acid (especially the polycarboxylic co-acids mentioned above) may depend on its pH compatibility. Thus, the addition of any pH sensitive co-acid is preferably done at a pH which avoids loss of the benefits associated with addition of the co-acid.

Once the desired reactions have occurred, the resulting pigments are preferably washed to remove any undesired ions. The pigments may then be processed by conventional techniques to obtain particles of the desired size and physical integrity. For example, the pigments may be wet-milled followed by spray drying or may be oven-dried followed by milling to the desired particle size. The pigments may be calcined in appropriate cases (e.g., to decompose undesired counter-ions, etc.).

Coating compositions containing the anticorrosion pigments of the invention (or combinations thereof) can be prepared using virtually any water-based, non-aqueous solvent-based or solvent-free vehicle or resin known in the coatings industry. In addition to whatever resin and solvent are used, the coating compositions may contain other typical ingredients appropriate for the resin system and intended application. Examples of resin systems are those based on oleoresins, alkyd resins and modified alkyd resins, epoxy resins and epoxy esters, chlorinated rubbers, vinyl resins, butyral resins, polyurethanes, polyesters, acrylic polymers, amino resins, polyamines, polyamides, organic and inorganic silicates, hydrocarbon resins and styreneacrylic resins. The anti-corrosive pigments of the invention may also be used in other polymer-containing materials such as adhesives, sealants, and elastomers.

EXAMPLES

The following examples are intended to illustrate this invention and should not be construed as being limitative. It is to be understood that all parts in the examples are by weight. The following abbreviations have been used:

HPA: hydroxyphosphonoacetic acid (sold commercially as BELCOR 575).

ATMP: nitrilotris-(methylenephosphonic) acid (sold commercially as DEQUEST 2000 or BRI-PHOS 301-50A).

A) Preparation of Pigments

1) Preparation of a Neutral Calcium Salt of HPA (Comparison Example)

A suspension of 44.20 g of calcium hydroxide (0.6 moles) in 362.00 g of demineralised water was prepared. Under constant stirring, 124.24 g of a 50% solution of HPA (0.4 moles) was added over a period of about 35 minutes at a rate oft 3 ml/minute. During the addition, the temperature reached about 40–50° C. The reaction mixture was heated to 90° C. and aged for 1 hour. The mixture was then allowed to stand under slow stirring at room temperature for a further 16 hours. The resulting brown precipitate was washed by centrifugation, oven dried at 120° C. for 16 hours and milled. The product yield was 92 g.

2) Preparation of a Neutral Zinc Salt of HPA (Comparison Example)

A suspension of 48.60 g of zinc oxide (0.6 moles) in 362.00 g of demineralised water was prepared. Under constant stirring, 124.80 g of a 50% solution of HPA (0.4 moles) was added over a period of about 35 minutes at a rate of 3 ml/minute. During the addition, the temperature reached about 40–50° C. The reaction mixture was heated to 90° C. and aged for 1 hour. The mixture was then allowed to stand at room temperature for a further 16 hours. The resulting slightly brown precipitate was washed by centrifugation, oven dried at 120° C. for 16 hours and milled. The product yield was 102 g.

3) Preparation of a Zinc Salt of HPA with an Excess of Zinc Oxide

A suspension of 48.60 g of zinc oxide (0.6 moles) in 362.00 g of demineralised water was prepared. Under constant stirring, 124.80 g of a 50% solution of HPA (0.4 moles) was added over a period of about 35 minutes at a rate of 3 ml/minute. During the addition, the temperature reached about 40–50° C. After the pH had stabilised, a further 145.80 g of zinc oxide (1.80 moles) was stirred in. The reaction mixture was heated to 90° C. and aged for 1 hour. The mixture was then allowed to stand at room temperature for a further 16 hours. The resulting brown precipitate was washed by centrifugation, oven dried at 120° C. for 16 hours and milled. The product yield was 233 g.

4) Preparation of a Calcium Salt of HPA with an Excess of Zinc Oxide

A suspension of 44.20 g of calcium hydroxide (0.6 moles) in 362.00 g of demineralised water was prepared. Under constant stirring, 124.80 g of a 50% solution of HPA (0.4 moles) was added over a period of about 35 minutes at a rate of 3 ml/minute. During the addition, the temperature reached about 40–50° C. After the pH had stabilised, a further 48.40 g of zinc oxide (0.60 moles) was stirred in. The reaction mixture was heated to 90° C. and aged for 1 hour. The mixture was then allowed to stand at room temperature for a further 16 hours. The resulting brown precipitate was washed by centrifugation, oven dried at 120° C. for 16 hours and milled. The product yield was 140 g.

5) Preparation of a Silica-modified Calcium Salt of HPA

A suspension of 44.80 g of a silica gel having an average particle size of about 3 $\mu$m in 362.00 g of demineralised water was prepared. Under constant stirring, 44.20 g of calcium hydroxide (0.60 moles) was added and the pH allowed to stabilise. 62.11 g of a 50% solution of HPA (0.20 moles) was then added under stirring over a period of about 15 minutes at a rate of 3 ml/minute. During the addition, the temperature reached about 40–50° C. The reaction mixture was heated to 90° C. and aged for 1 hour. The mixture was then allowed to stand at room temperature for a further 16 hours. Thereupon, the brown precipitate was washed by centrifugation, oven dried at 120° C. for 16 hours and milled. The product yield was 103 g.

6) Preparation of a Silica-modified Calcium Salt of HPA with an Excess of Zinc Oxide A suspension of 44.80 g of a silica gel having an average particle size of about 3 $\mu$m in 362.00 g of demineralised water was prepared. Under constant stirring, 44.20 g of calcium hydroxide (0.60 moles) was added and the pH allowed to stabilise. 62.11 g of a 50% solution of HPA (0.20 moles) was then added under stirring over a period of about 15 minutes at a rate of 3 ml/minute. During the addition, the temperature reached about 40–50° C. After the pH had stabilised, a further 48.40 g of zinc oxide (0.60 moles) was stirred in. The reaction mixture was heated to 90° C. and aged for 1 hour. The mixture was then allowed to stand at room temperature for a further 16 hours. The resulting brown precipitate was washed by centrifugation, oven dried at 120° C. for 16 hours and milled. The product yield was 149 g.

7) Preparation of a Silica-modified Zinc Salt of HPA with an Excess of Zinc Oxide A suspension of 44.80 g of a silica gel having an average particle size of about 3 $\mu$m in 362.00 g of demineralised water was prepared. Under constant stirring, 72.90 g of zinc oxide (0.90 moles) was added and the pH allowed to stabilise. 93.60 g of a 50% solution of HPA (0.30 moles) was then added under stirring over a period of about 30 minutes at a rate of 3 ml/minute. During the addition, the temperature reached about 40–50° C. After the pH had stabilised, a further 24.30 g of zinc oxide (0.30 moles) was stirred in. The reaction mixture was heated to 90° C. and aged for 1 hour. The mixture was then allowed to stand at room temperature for a further 16 hours. The resulting brown precipitate was washed by centrifugation, oven dried at 120° C. for 16 hours and milled. The product yield was 159 g.

8) Preparation of a Silica-modified Calcium/zinc Salt of HPA with an Excess of Zinc Oxide A suspension of 44.80 g of a silica gel having an average particle size of about 3 $\mu$m in 244.45 g of demineralised water was prepared. Under constant stirring, 42.18 g of calcium hydroxide (0.57 moles) was added followed by 18.95 g of zinc oxide (0.23 moles) and the pH allowed to stabilise. 123.55 g of a 50% solution of HPA (0.40 moles) was then added under stirring over a period of about 35 minutes at a rate of 3 ml/minute. During the addition, the temperature reached about 40–50° C. After the pH had stabilised, a further 24.30 g of zinc oxide (0.30 moles) was stirred in. The reaction mixture was heated to 90° C. and aged for 1 hour. The mixture was then allowed to stand at room temperature for a further 16 hours. The resulting brown precipitate was washed by centrifugation, oven dried at 120° C. for 16 hours and milled. The product yield was 169 g.

9) Preparation of a Silica-modified Calcium/magnesium Salt of HPA with an Excess of Magnesium Oxide A suspension of 45.00 g of a silica gel having an average particle size of about 3 $\mu$m in 386.70 g of demineralised water was prepared. Under constant stirring, 42.18 g of calcium hydroxide (0.57 moles) was added and the pH allowed to stabilise. 58.80 g of a 50% solution of HPA (0.19 moles) was then added under stirring at a rate of 3 ml/minute. After the pH had stabilised, 9.43 g of magnesium oxide (0.23 moles) was stirred in and a further 44.66 g of 50% HPA solution (0.16 moles) was added at a rate of 3 ml/minute. During the addition, the temperature reached about 40–50° C. After the pH had stabilised, a further 18 g (0.45 moles) of magnesium oxide was stirred in. The reaction mixture was heated to 90° C. and aged for 1 hour. The mixture was then allowed to stand at room temperature for a further 16 hours. The resulting brown precipitate was washed by centrifugation, oven dried at 120° C. for 16 hours and milled. The product yield was 149 g.

10) Preparation of a Silica-modified Calcium Salt of ATMP

A suspension of 44.80 g of a silica gel having an average particle size of about 3 μm in 362.00 g of demineralised water was prepared. Under constant stirring, 44.20 g of calcium hydroxide (0.60 moles) was added and the pH allowed to stabilise. 59.51 g of a 50% solution of ATMP (0.10 moles) was then added under stirring over a period of about 15 minutes at a rate of 3 ml/minute. During the addition, the temperature reached about 40° C. The reaction mixture was heated to 90° C. and aged for 1 hour. The mixture was then allowed to stand at room temperature for a further 16 hours. The resulting white precipitate was washed by centrifugation, oven dried at 120° C. for 16 hours and milled. The product yield was 106 g.

11) Preparation of a Silica-modified Calcium/zinc Salt of HPA

A suspension of 20.63 g of silica gel having an average particle size of about 3 μm in 80.36 g demineralised water was prepared. 11.84 g of zinc chloride (0.087 moles) and 13.15 g of calcium chloride dihydrate (0.089 moles) were dissolved in the suspension. 19.28 g of a 50% solution of HPA (0.062 moles) was then added, and the pH was increased to 6 by the addition of 2M NaOH at a rate of 3 ml/min. The reaction mixture was aged for 24 hours at room temperature. The resulting brown precipitate was filtered, washed, oven dried at 120° C. for 16 hours and milled. The product yield was 25 g.

B) Standard Anti-Corrosive Pigments

Zinc potassium chromate, strontium chromate, zinc phosphate (SICOR ZNP/M and HEUCOPHOS ZMP), aluminium triphosphate-based pigments (K-White 84, 105, 140W), and calcium-exchanged silica (SHIELDEX AC5) pigments were used to judge the performance of the pigments of the present invention.

C) Anti-Corrosive Coating Test Conditions

The above mentioned pigments of sections A and B were evaluated in various anti-corrosive coating systems as given below. The paints were applied to test panels by bar coater to specified film thicknesses and allowed to dry or cure according to the requirements of the paint system. The panels were then scribed and tested in salt spray (ASTM B117), humidity (DIN 50017) or immersed in water for varying periods of time. After testing, the panels were examined immediately for blistering, scribe rusting, scribe adhesion loss, adhesion loss over the panel and through-film corrosion. In this connection, the following standards were employed:

a) ASTM D610
b) ASTM D714
c) ASTM D3359
d) ASTM D1654

In all cases the results are reported on a numerical scale from 0 to 10 in which 0 is best and 10 is worst. A value of 3 or less is generally desired.

D) Anti-Corrosive Coating Compositions and Test Results

Pigments taken from groups A and B were tested in various water-borne and non-aqueous solvent-borne resin systems. Resins used for this purpose and conditions of test are given below.

a) Acronal S760 (Styrene-Acrylic Dispersion)

Items 1–9 below were dispersed to 25 μm using a pearl mill. Items 10 and 11 were added with stirring. Items 12–14 were premixed and added after ageing the paint overnight to achieve a paint having a pigment volume concentration (PVC) of 25% and 54 wt. % solids.

|     |                                | Wt. %  |
| --- | ------------------------------ | ------ |
| 1.  | Demineralised water            | 15.22  |
| 2.  | AMP95 (dispersant)             | 0.09   |
| 3.  | Surfynol 104E (wetting agent)  | 0.27   |
| 4.  | Agitan 280 (defoamer)          | 0.28   |
| 5.  | Talc 20MOOS                    | 12.66  |
| 6.  | Bayferrox 130M (red iron oxide)| 10.68  |
| 7.  | Anti-corrosive pigment (A3-A11)| 4.20   |
| 8.  | Acronal S760                   | 9.69   |
| 9.  | White Spirit                   | 0.89   |
| 10. | Acronal S76O                   | 41.25  |
| 11. | Agitan 280 (defoamer)          | 0.28   |
| 12. | Collacral PU85 (thickener)     | 0.98   |
| 13. | Demineralised water            | 0.85   |
| 14. | Butyl diglycol                 | 2.68   |
|     |                                | 100.00 |

Comparison examples A1 and A2 were also prepared using the above formulation. Additional comparison examples were prepared as follows with the amount of talc being adjusted to maintain PVC at 25%.

a. ZnO: 1.8 wt. % zinc oxide only.
b. Zn—K Chromate: 0.9 wt. % zinc potassium chromate (higher levels were unstable).
c. Zn Phosphate+ZnO: 8 wt. % SICOR ZNP/M+1.8 wt. % ZnO
d. Ca-SiO$_2$+ZnO: 4.4 wt. % Shieldex AC5+1.8 wt. % ZnO
e. Modified Aluminium Triphosphate: 7.5 wt. % K-White 84
f. Modified Aluminium Triphosphate: 7.5 wt. % K-White 140W
g. Modified Aluminium Triphosphate: 7.5 wt. % K-White 105.

Paints were applied to degreased cold rolled steel test panels (Q-Panels S412) to a dry film thickness of about 80 μm. The coated panels were allowed to dry for 7 days at room temperature before testing under salt spray and water soak conditions for a period of 240 hours. Test results are given in Table 1.

TABLE 1

|         | Salt Spray Test | | | | Water Immersion Test |
| ------- | --------------- | ---------------------- | --------------- | ---------- | -------------------- |
| Pigment | Scribe Rusting  | Through-film Corrosion | Scribe Adhesion Loss | Blistering | Adhesion loss over panel |
| A1      | ~0              | 2                      | 0.5             | 7          | ~0                   |
| A2      | 2               | 7                      | 0.5             | 9          | ~0                   |
| A3      | ~0              | 0.2                    | ~0              | 6          | ~0                   |
| A4      | ~0              | ~0                     | 0.6             | 1.7        | 4                    |
| A5      | ~0              | ~0                     | 0.9             | ~0         | 1.2                  |
| A6      | ~0              | ~0                     | 0.3             | ~0         | ~0                   |
| A7      | 2               | 1                      | 0.1             | 1          | ~0                   |
| A8      | 0.2             | ~0                     | ~0              | 1.2        | ~0                   |
| A9      | 4               | 0.5                    | ~0              | 2          | 4                    |
| A11     | 2               | ~0                     | ~0              | 4.5        | ~0                   |
| ZnO     | 8               | 0.5                    | 3               | 3.2        | ~0                   |

TABLE 1-continued

| | Salt Spray Test | | | | Water Immersion Test |
|---|---|---|---|---|---|
| Pigment | Scribe Rusting | Through-film Corrosion | Scribe Adhesion Loss | Blistering | Adhesion loss over panel |
| Zn—K Chromate | 6 | 0.4 | ~0 | ~0 | ~0 |
| Zn Phosphate + ZnO | 8 | 0.2 | ~0 | 1 | ~0 |
| Ca—SiO$_2$ + ZnO | 6 | 1.5 | ~0 | 3.5 | ~0 |
| KW 84 | ~0 | 8 | ~0 | 9 | ~0 |
| KW 140W | ~0 | 6 | ~0 | 9 | ~0 |
| KW-105 | 6 | 1 | ~0 | 6.3 | ~0 | b) Resydrol 4333 (Water-Borne Alkyd Emulsion)

Items 1–11 below were dispersed to 25 μm using a pearl mill. After ageing the paint overnight, the pH was adjusted to 9.5 with a 25% ammonia solution to achieve a paint having a pigment volume concentration (PVC) of 25% and 55 wt. % solids.

| | | Wt. % |
|---|---|---|
| 1. | Resydrol 4333 (45%) | 62.40 |
| 2. | DMAMP80 (dispersant) | 0.74 |
| 3. | Additol VXW4940 (drier) | 0.84 |
| 4. | Additol XL297 (anti-skinning agent) | 0.41 |
| 5. | Hydropalat 532 (wetting agent) | 0.52 |
| 6. | Agitan 703 (defoamer) | 0.40 |
| 7. | Demineralised water | 7.78 |
| 8. | Anti-corrosive pigment (A3-A11) | 2.54 |
| 9. | Bayferrox 130M (red iron oxide) | 8.77 |
| 10. | Talc 20MOOS | 12.77 |
| 11. | Millicarb B (Calcium carbonate) | 2.84 |
| | | 100.00 |

Comparison examples A1 and A2 were also prepared using the above formulation. Additional comparison examples were prepared as follows with the amount of talc being adjusted to maintain PVC at 25%.

a. ZnO: 1.9 wt. % zinc oxide only.
b. Zn—K Chromate: 1.6 wt. % zinc potassium chromate (higher levels were unstable).
c. Zn Phosphate+ZnO: 8.5 wt. % SICOR ZNP/M+1.9 wt. % ZnO
d. Ca-SiO$_2$+ZnO: 4.6 wt. % Shieldex ACS+1.9 wt. % ZnO
e. Modified Aluminium Triphosphate: 7.8 wt. % K-White 84
f. Modified Aluminium Triphosphate: 7.8 wt. % K-White 140W
g. Modified Aluminium Triphosphate: 7.8 wt. % K-White 105.

Paints were applied to degreased cold rolled steel test panels (Q-Panels S412) to a dry film thickness of about 40 μm. The coated panels were allowed to dry for 7 days at room temperature before testing under salt spray and water soak conditions for a period of 240 hours. Test results are given in Table 2.

TABLE 2

| | Salt Spray Test | | | | Water Immersion Test |
|---|---|---|---|---|---|
| Pigment | Scribe Rusting | Through-film Corrosion | Scribe Adhesion Loss | Blistering | Adhesion loss over panel |
| A1 | 4 | 9 | * | 9 | 5 |
| A2 | 4 | 9 | * | 9 | 9 |
| A3 | 2 | 6 | 10 | 4.5 | 1 |
| A4 | 4 | 2 | 1.8 | 3.6 | 6.4 |
| A5 | 4 | 2 | ~0 | 1.1 | ~0 |
| A6 | 4 | ~0 | 0.3 | ~0 | 4.4 |
| A7 | 2 | 3 | 10 | 4.3 | ~0 |
| A8 | ~0 | 2 | 7 | 1.9 | 5.2 |
| A9 | 6 | 5 | ~0 | 4.5 | 2.7 |
| A11 | 2 | ~0 | 10 | 6.8 | 2 |
| ZnO | 8 | ~0 | 6 | ~0 | ~0 |
| Zn—K Chromate | 4 | 0.2 | ~0 | 0.2 | 8 |
| Zn Phosphate + ZnO | 4 | ~0 | 6 | ~0 | ~0 |
| Ca—SiO$_2$ + ZnO | 4 | ~0 | 4 | ~0 | ~0 |
| KW 84 | 4 | ~0 | 2 | 4 | 0.1 |
| KW 140W | 4 | ~0 | 3 | 9 | 4.3 |
| KW-105 | 6 | ~0 | 0 | 6.5 | 8.7 |

* not measurable due to severe blistering and through-film corrosion c) Bayhydrol 130 (Styrene-Butadiene Emulsion modified with maleinised oil)

Items 1–13 below were dispersed to 25 μm using a pearl mill to achieve a paint having a pigment volume concentration (PVC) of 38% and 52 wt. % solids.

| | | Wt. % |
|---|---|---|
| 1. | Bayhydrol 130 | 61.64 |
| 2. | Servosyn 8% Co WEB (drier) | 0.15 |
| 3. | Ascinin R (anti-skinning agent) | 0.29 |
| 4. | Hydropalat 532 (wetting agent) | 0.35 |
| 5. | Agitan 703 (defoamer) | 0.31 |
| 6. | Bayferrox 130M (red iron oxide) | 10.81 |
| 7. | Microdol Extra (dolomite) | 5.28 |
| 8. | Talc 20MOOS | 13.87 |
| 9. | Aerosil 300(Fumed Silica) | 0.20 |
| 10. | Anti-corrosive pigment (A6) | 2.67 |
| 11. | Zinc oxide | 1.09 |
| 12. | Demineralised water | 2.40 |
| 13. | Butyl diglycol | 0.92 |
| | | 100.00 |

Comparison examples were prepared as follows with the amount of talc being adjusted to maintain PVC at 25%. All formulations contained about 1 wt. % ZnO.

a. Blank: No anti-corrosive pigment
b. Zn Phosphate: 8.2 wt. % SICOR ZNP/M
c. Ca-SiO$_2$: 4.4 wt. % Shieldex AC5
d. Modified Aluminium Triphosphate: 7.3 wt. % K-White 84

Paints were applied to degreased cold rolled steel test panels (Q-Panels S412) to a dry film thickness of about 40 μm. The coated panels were allowed to dry for 7 days at room temperature before testing under salt spray and water soak conditions for a period of 240 hours. 1% ZnO was included in all the formulations tested. Test results are given in Table 3.

TABLE 3

| Pigment | Salt Spray Test | | | | Water Immersion Test |
|---|---|---|---|---|---|
| | Scribe Rusting | Through-film Corrosion | Scribe Adhesion Loss | Blistering | Adhesion loss over panel |
| A6 | ~0 | 2 | ~0 | 6.5 | ~0 |
| Blank | ~0 | 7 | ~0 | 9.5 | ~0 |
| Zn Phosphate | ~0 | 8 | ~0 | 9.5 | ~0 |
| Ca—SiO$_2$ | ~0 | 9 | ~0 | 9.5 | ~0 |
| KW 84 | 2 | 2 | ~0 | 9 | ~0 | d) 2-pack Water-borne Epoxy-amine Adduct 1

Items 1–10 below were dispersed to 25 μm using a pearl mill. Parts A and B were mixed in a weight ratio of 100:71.33 to achieve a paint having a pigment volume concentration (PVC) of 30% and 58 wt. % solids.

| | | Wt. % |
|---|---|---|
| | Part A | |
| 1. | Epilink DP660 (Amine adduct) | 13.84 |
| 2. | VEH 2133 (Amine adduct) | 1.11 |
| 3. | Demineralised water | 33.43 |
| 4. | Byk 033 (defoamer) | 0.15 |
| 5. | Bayferrox 130M (red iron oxide) | 17.06 |
| 6. | Talc 20MOOS | 19.32 |
| 7. | Plastorit M (Silicate filler) | 9.66 |
| 8. | Alcophor 827 | 1.31 |
| 9. | Anti-corrosive pigment (A11) | 3.65 |
| 10. | Byk 341 (flow agent) | 0.48 |
| | | 100.00 |
| | Part B | |
| 1. | Beckopox VEP 2385 (epoxy resin) | 71.28 |
| 2. | Byk 033 (defoamer) | 0.05 |
| | | 71.33 |

Comparison examples were prepared as follows with the amount of talc and Plastorit being adjusted to maintain PVC at 30%.
a. Blank: No anti-corrosive pigment
b. Zn—K Chromate: 2.1 wt. % zinc potassium chromate
c. Zn Phosphate: 13.3 wt. % HEUCOPHOS ZMP
d. Ca-SiO$_2$: 7.3 wt. % Shieldex AC5

Paints were applied to degreased cold rolled steel test panels (Q-Panels S412) to a dry film thickness of about 40 μm. The coated panels were allowed to dry for 7 days at room temperature before testing under salt spray and water soak conditions for a period of 240 hours. Test results are given in Table 4.

TABLE 4

| Pigment | Salt Spray Test | | | | Water Immersion Test |
|---|---|---|---|---|---|
| | Scribe Rusting | Through-film Corrosion | Scribe Adhesion Loss | Blistering | Adhesion loss over panel |
| A11 | 4.1 | 7 | 10 | ~0 | ~0 |
| Blank | 6 | 5 | 10 | 6.5 | 10 |
| Zn—K Chromate | 6 | 5 | ~0 | 6.5 | 10 |
| Zn Phosphate | 4.6 | ~0 | 10 | 2 | 10 |
| Ca—SiO$_2$ | 6 | 5 | 10 | 4.5 | 10 | e) 2-pack Water-borne Epoxy-amine Adduct 2

Items 1–10 below were dispersed to 25 μm using a pearl mill. Parts A and B were mixed in a weight ratio of 100:42.94 to achieve a paint having a pigment volume concentration (PVC) of 30% and 63 wt. % solids.

| | | Wt. % |
|---|---|---|
| | Part A | |
| 1. | Epilink DP660 (Amine adduct) | 17.61 |
| 2. | VEH 2133 (Amine adduct) | 1.42 |
| 3. | Demineralised water | 29.52 |
| 4. | Byk 033 (defoamer) | 0.15 |
| 5. | Surfynol 104E (wetting agent) | 0.47 |
| 6. | Bayferrox 130M (red iron oxide) | 16.82 |
| 7. | Talc 20MOOS | 19.05 |
| 8. | Plastorit M (Silicate filler) | 10.61 |
| 9. | Anti-corrosive pigment (A6 & A8) | 3.88 |
| 10. | Byk 341 (flow agent) | 0.47 |
| | | 100.00 |
| | Part B | |
| 1. | Beckopox VEP 2385 (epoxy resin) | 24.87 |
| 2. | Epires ER8 (expoxy resin) | 13.69 |
| 3. | Byk 033 (defoamer) | 0.05 |
| 4. | Demineralised water | 4.33 |
| | | 42.94 |

Comparison examples were prepared as follows with the amount of talc and Plastorit being adjusted to maintain PVC at 30%.

a. Blank: No anti-corrosive pigment
b. Zn—K Chromate: 2.1 wt. % zinc potassium chromate
c. Zn Phosphate: 13.3 wt. % SICOR ZNP/M
d. Ca-SiO$_2$: 7.3 wt. % Shieldex AC5

Paints were applied to degreased cold rolled steel test panels (Q-Panels S412) to a dry film thickness of about 40 μm. The coated panels were allowed to dry for 7 days at room temperature before testing under salt spray and water soak conditions for a period of 240 hours. Test results are given in Table 5.

TABLE 5

| Pigment | Salt Spray Test | | | | Water Immersion Test |
|---|---|---|---|---|---|
| | Scribe Rusting | Through-film Corrosion | Scribe Adhesion Loss | Blistering | Adhesion loss over panel |
| A6 | 4 | ~0 | 6 | ~0 | ~0 |
| A8 | 4 | 1 | 6 | ~0 | ~0 |
| Blank | 6 | 1 | 7 | 3 | 4 |
| Zn—K Chromate | 6 | 5 | ~0 | ~0 | ~0 |
| Zn Phosphate | 4 | ~0 | 6 | ~0 | ~0 |
| Ca—SiO₂ | 4 | ~0 | 7 | 3 | 4 | f) Epoxy-Urea Coil Coating Primer

Items 1–10 below were dispersed to 25 μm using a pearl mill to achieve the above-mentioned primer having a pigment volume concentration (PVC) of 20% and 40 wt. % solids.

| | | Wt. % |
|---|---|---|
| 1. | Epikote 1009 (30%) | 21.49 |
| 2. | Epikote 1007 (40%) | 37.60 |
| 3. | Solvesso 150 | 9.19 |
| 4. | Ethoxy propyl acetate | 10.53 |
| 5. | Diacetone alcohol | 1.32 |
| 6. | Aerosil 200 | 0.20 |
| 7. | Anti-corrosive pigment (A11) | 8.36 |
| 8. | Tiona 472 (TiO₂) | 3.09 |
| 9. | ASP170 (aluminium silicate filler) | 2.17 |
| 10. | UFR 80 (urea-formaldehyde) | 6.04 |
| | | 100.00 |

Epikote 1009 (30% solution)

| 1. | Epikote 1009 | 30.00 |
|---|---|---|
| 2. | Solvesso 150 | 28.00 |
| 3. | Ethoxy propyl acetate | 28.00 |
| 4. | Butanol | 10.50 |
| 5. | Diacetone alcohol | 3.50 |
| | | 100.00 |

Epikote 1007 (40% solution)

| 1. | Epikote 1007 | 40.00 |
|---|---|---|
| 2. | Solvesso 150 | 24.00 |
| 3. | Ethoxy propyl acetate | 24.00 |
| 4. | Butanol | 9.00 |
| 5. | Diacetone alcohol | 3.00 |
| | | 100.00 |

Comparison examples were prepared as follows with the amount of Tiona 472 being adjusted to maintain PVC at 20%.
a. Blank: No anti-corrosive pigment
b. Sr-Chromate: 7.8 wt. % strontium chromate
b. Zn Phosphate: 14.7 wt. % SICOR ZNP/M
c. Ca-SiO₂: 8.4 wt. % Shieldex CP4-7394

Primers were applied to Bonder 1303 treated (hot-dip) galvanised steel to a dry film thickness of 5 μm; curing was to a peak metal temperature of 216–224° C. (Olsen Temperature 350° C., 35 seconds). After quenching, a polyester topcoat (formulation given under g) below) was applied to a dry film thickness of 20 μm; curing was to a peak metal temperature of 224–232° C. Panels were tested in salt spray and humidity for 1000 hours and the results are given in Table 6.

TABLE 6

| Pigment | Salt Spray Test | | | | Humidity Test |
|---|---|---|---|---|---|
| | Scribe Rusting | Cut Edge Creepage | Scribe Adhesion Loss | Blistering | Adhesion loss over panel |
| A11 | ~0 | 7 | ~0 | ~0 | ~0 |
| Blank | ~0 | 7 | 3 | ~0 | ~0 |
| Sr Chromate | ~0 | 7 | 1 | ~0 | ~0 |
| Zn Phosphate | ~0 | 8 | 4 | ~0 | ~0 |
| Ca—SiO₂ | ~0 | 7 | 1 | ~0 | ~0 | g) Polyester-Melamine Coil Coating Primer

Items 1–10 below were dispersed to 25 μm using a pearl mill to achieve a primer having a pigment volume concentration (PVC) of 20% and 38 wt. % solids.

| | | Wt. % |
|---|---|---|
| 1. | Dynapol L205 (30%) | 53.12 |
| 2. | Dynapol L208 (30%) | 13.28 |
| 3. | Solvesso 150 | 5.98 |
| 4. | Dibasic Ester Solvent | 4.65 |
| 5. | Diacetone alcohol | 2.66 |
| 6. | Anti-corrosive pigment (A5,A10) | 9.68 |
| 7. | Tiona 472 (TiO₂) | 3.10 |
| 8. | Talc IT Extra | 1.45 |
| 9. | Cymel 350 (melamine) | 4.49 |
| 10. | EDBSA (sulphonic acid) | 1.61 |
| | | 100.00 |

Dynapol L205 (30% solution)

| 1. | Dynapol L205 | 30.00 |
|---|---|---|
| 2. | Solvesso 150 | 31.50 |
| 3. | Dibasic ester solvent | 24.50 |
| 4. | Diacetone alcohol | 14.00 |
| | | 100.00 |

Dynapol L208 (30% solution)

| 1. | Dynapol L280 | 30.00 |
|---|---|---|
| 2. | Solvesso 150 | 31.50 |
| 3. | Dibasic ester solvent | 24.50 |
| 4. | Diacetone alcohol | 14.00 |
| | | 100.00 |

Comparison examples were prepared as follows with the amount of Tiona 472 being adjusted to maintain PVC at 20%.
a. Blank: No anti-corrosive pigment
b. Sr-Chromate: 7.3 wt. % strontium chromate
c. Ca-SiO₂: 7.2 wt. % Shieldex CP4-7394

Primers were applied to Bonder 1303 treated (hot dip) galvanised steel to a dry film thickness of 5 μm; curing was to a peak metal temperature of 216–224° C. (Oven Temperature 350° C., 35 seconds). After quenching, a polyester topcoat described below was applied to a dry film thickness of 20 μm; curing was to a peak metal temperature of 224–232° C. Panels were tested in salt spray and humidity for 1000 hours and the results are given in Table 7.

Polyester-melamine Topcoat Formulation

Items 1–9 were dispersed in a pearl mill. Items 10–13 were mixed separately and added to items 1–9. Items 14–18 were mixed separately and added to items 1–13.

|  |  | Wt. % |
| --- | --- | --- |
| 1. | Dynapol LH830 (60%) | 25.00 |
| 2. | Aerosil 200 | 0.20 |
| 3. | Special Black 4 | 0.50 |
| 4. | Lichtgelb 3R | 5.40 |
| 5. | Bayferrox 140M | 3.30 |
| 6. | TiO$_2$ CL310 | 2.60 |
| 7. | Butyldiglycol | 4.00 |
| 8. | Disparion L1984 (flow agent) | 1.00 |
| 9. | Solvesso 200 | 7.00 |
| 10. | Dynapol LH830 (60%) | 24.00 |
| 11. | Syloid ED50 (matting agent) | 4.50 |
| 12. | Solvesso 200 | 5.50 |
| 13. | Butyldiglycol | 4.00 |
| 14. | Cymel 303 (melamine) | 7.00 |
| 15. | Byk VP 450 (catalyst) | 0.20 |
| 16. | Cynapol 1203 (catalyst) | 1.00 |
| 17. | Epikote 828 | 1.00 |
| 18. | Solvesso 150 | 3.80 |
|  |  | 100.00 |

TABLE 7

| | Salt Spray Test | | | | Humidity Test |
| --- | --- | --- | --- | --- | --- |
| Pigment | Scribe Rusting | Cut Edge Creepage | Scribe Adhesion Loss | Blistering | Adhesion loss over panel |
| A5 | ~0 | 6 | 3 | ~0 | ~0 |
| A10 | ~0 | 6 | 3 | ~0 | ~0 |
| Blank | 4 | 8 | 3 | ~0 | ~0 |
| Sr Chromate | ~0 | 8 | 3 | ~0 | ~0 |
| Ca—SiO$_2$ | 4 | 9 | 3 | ~0 | ~0 |

I claim:

1. An anti-corrosive pigment comprising a polyvalent metal organophosphonate wherein the organophosphonate corresponds to phosphono carboxylic acid containing one or more acid groups and the ratio of polyvalent metal in said organophosphonate to acid group or groups in the corresponding phosphono carboxylic acid is greater than one on an equivalents basis.

2. An anti-corrosive pigment according to claim 1 wherein the phosphono carboxylic acid contains one acid group.

3. The anti-corrosive pigment according to claim 1 wherein said polyvalent metal is selected from the group consisting of magnesium, calcium, strontium, barium, zinc, cobalt, nickel, iron, titanium, zirconium, aluminum and mixtures thereof.

4. The anti-corrosive pigment according to claim 1 wherein said polyvalent metal comprises a combination of at least two metals selected from the group consisting of zinc, calcium, magnesium and aluminum.

5. The anti-corrosive pigment according to claim 1 wherein said pigment is free of transition metal.

6. The anti-corrosive pigment according to claim 1 wherein said pigment is free of zinc.

7. The anti-corrosive pigment according to claim 1 wherein said ratio of polyvalent metal in said organophosphonate to acid group or groups in the corresponding phosphono carboxylic acid is 1.25:1–5:1 on an equivalents basis.

8. The anti-corrosive pigment according to claim 3 wherein the organophosphonate corresponds to hydroxyphosphonoacetic acid.

9. An anti-corrosive pigment according to claim 1 further comprising a member of a group consisting of an essentially water insoluble co-acid, a polyvalent metal salt of an essentially water insoluble co-acid and mixtures of said co-acid and polyvalent metal salt of said co-acid.

10. The anti-corrosive pigment according to claim 9 wherein said polyvalent metal is selected from the group consisting of magnesium, calcium, strontium, barium, zinc, cobalt, nickel, iron, titanium, zirconium, aluminum and mixtures thereof.

11. The anti-corrosive pigment according to claim 9 wherein said polyvalent metal comprises a combination of at least two metals selected from the group consisting of zinc, calcium, magnesium and aluminum.

12. The anti-corrosive pigment according to claim 9 wherein said pigment is free of transition metals.

13. The anti-corrosive pigment according to claim 9 wherein said pigment is free of zinc.

14. The anti-corrosive pigment according to claim 9 wherein said ratio of polyvalent metal in said organophosphonate to acid groups on the corresponding phosphono carboxylic acid is 1.25:1–5:1 on an equivalents basis.

15. The anti-corrosive pigment according to claim 9 wherein said co-acid comprises silica and/or silica alumina.

16. The anti-corrosive pigment according to claim 9 wherein at least a portion of said polyvalent organophosphonate corresponds to phosphono carboxylic acid selected from the group consisting of hydroxyphosphonoacetic acid, 2-phosphonobutanetricarboxylic acid, phosphonated oligomers of maleic acid or acrylic acid, phosphonated maleic acid/acrylic acid co-oligomers and mixtures thereof.

17. The anti-corrosive pigment according to claim 15 wherein said pigment contains 5 to 95 wt. % of said co-acid.

18. An anti-corrosive primer or coating composition comprising a polyvalent metal organophosphioniate wherein the organophosphonate corresponds to phosphono carboxylic acid containing one or more acid groups and the ratio of polyvalent metal in said organophosphonate to acid group or groups in the corresponding phosphono carboxylic acid is greater than one on an equivalents basis.

19. The primer or coating of claim 18 wherein said polyvalent metal is selected from the group consisting of magnesium, calcium, strontium, barium, zinc, cobalt, nickel, iron, titanium, zirconium, aluminum and mixtures thereof.

20. The primer or coating of claim 18 wherein the organophosphonate corresponds to hydroxyphosphonoacetic acid.

21. An anti-corrosive primer or coating composition comprising, (a) polyvalent metal organophosphonate wherein the organophosphonate corresponds to phosphono carboxylic acid containing one or more acid groups and the ratio of polyvalent metal in said organophosphonate to acid groups in the corresponding phosphono carboxylic acid is greater than or equal to one on an equivalents basis, and (b) a member of a group consisting of an essentially water insoluble co-acid, a polyvalent metal salt of an essentially water insoluble co-acid or mixtures of said co-acid and polyvalent metal salt of said co-acid.

22. A primer or coating composition of claim 21 wherein the co-acid comprises silica and/or silica/alumina.

23. A primer or coating composition of claim 22 wherein at least a portion of said polyvalent organophosphonate corresponds to organophosphonic acid selected from the group consisting of hydroxyphosphonoacetic acid, 2-phosphonobutanetricarboxylici acid, aminotrimethylenephosphonic acid, hydroxyethanediphosphonic acid, phosphonated oligomers of maleic acid or acrylic acid, phosphonated maleic acid/acrylic acid co-oligomers and mixtures thereof.

24. A process for preparing anti-corrosive pigments comprising (a) mixing an organophosphonic component selected from the group consisting phosphono carboxylic acid, phosphono carboxylic acid salt, and mixtures thereof, with water and at least one polyvalent metal compound to form a reaction mixture and (b) reacting said organophosphonic component and said polyvalent metal compound to form polyvalent metal organophosphonate.

25. The process according to claim 24 wherein solid co-acid is combined with the polyvalent compound prior to mixing with organophosphonic component.

26. A process according to claim 24 wherein water-insoluble co-acid is added to the reaction mixture.

27. The process according to claim 24 wherein all excess of sparingly soluble polyvalent metal oxide or hydroxide is added to the reaction mixture in addition to said polyvalent metal compound whereby an organophosphonate having a ratio polyvalent metal to acid groups in the corresponding phosphono carboxylic acid of 1.25:1–5:1 on an equivalent basis is formed.

28. The process according to claim 24 wherein the reaction mixture in step (a) is adjusted to a pH in the range of about 4 to about 9 by addition of a base to said reaction mixture.

29. The process according to claim 24 wherein the reaction mixture is heated to between 40° C. and 95° C. during step (b).

30. The process according to claim 24 wherein a slurry containing said polyvalent metal organophosphonate is formed in step (b) which slurry is subsequently treated to recover pigment particles containing said polyvalent metal organophosphonate.

31. The process according to claim 30 wherein said subsequent treatment comprises wet-milling, spray drying and/or dry milling.

* * * * *

UNITED STATES PATENT AND TRADEMARK OFFICE
CERTIFICATE OF CORRECTION

PATENT NO.    : 6,083,308  
DATED         : July 4, 2000  
INVENTOR(S)   : Tim Fletcher Page 1 of 1

It is certified that error appears in the above-identified patent and that said Letters Patent is hereby corrected as shown below:

Column 18,
Line 32, "organophosphioniate" should be "organophosphonate".

Column 19,
Line 3, insert the word "of" after the word "consisting".
Line 14, "all excess" should be "an excess.

Signed and Sealed this

Fourteenth Day of August, 2001

*Attest:*

NICHOLAS P. GODICI
*Attesting Officer*    *Acting Director of the United States Patent and Trademark Office*